United States Patent
Carlstedt et al.

(10) Patent No.: US 6,866,276 B2
(45) Date of Patent: Mar. 15, 2005

(54) ROLL BUMPER STABILIZER BAR LINKS

(75) Inventors: Robert P. Carlstedt, Rochester Hills, MI (US); James B. Chamberlin, Charlotte, NC (US); Ragnar Ledesma, Sterling Heights, MI (US); Nancy L. Saxon, Oakland Township, MI (US); Dennis A. Kramer, Troy, MI (US); Doyle R. Downey, Beverly Hills, MI (US); Joseph Cubalchini, Jr., St. Charles, IL (US); Monte G. Williams, Royal Oak, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/143,289

(22) Filed: May 10, 2002

(65) Prior Publication Data

US 2003/0209870 A1 Nov. 13, 2003

(51) Int. Cl.[7] .............................................. B60G 21/055
(52) U.S. Cl. ......................... 280/124.107; 280/124.106; 267/189
(58) Field of Search ................... 280/124.107, 124.106, 280/124.13, 124.131, 124.101, 124.133; 267/188, 189

(56) References Cited

U.S. PATENT DOCUMENTS

| 4,066,278 A | * | 1/1978 | Takagi ................. 280/124.152 |
| 4,369,988 A | * | 1/1983 | Takagi ................. 280/124.137 |
| 4,854,766 A | * | 8/1989 | Hein ......................... 403/224 |
| 4,944,523 A | * | 7/1990 | Hardy et al. .......... 280/124.152 |
| 5,062,656 A | * | 11/1991 | Hynds et al. ......... 280/124.152 |
| 5,224,790 A | * | 7/1993 | Hein ......................... 403/225 |
| 5,551,722 A | * | 9/1996 | Schwartz et al. ..... 280/124.152 |
| 5,984,283 A | * | 11/1999 | Tsuiki et al. ................. 267/33 |
| 6,402,171 B1 | * | 6/2002 | Nickerson et al. .... 280/124.106 |

OTHER PUBLICATIONS

GlobalSpec, Product Finder, Durometers, 1999–2004 GlobalSpec, htt://test–equipment.globalspec.com/LearnMore/Labware_Test_Measurement/Product_Material_Testing/Durometers.*

Materials.co.uk, Rubber Hardness, date unknown, Materials.co.uk, http://www.materials.co.uk/rubber.htm.*

* cited by examiner

Primary Examiner—Teri P. Luu
Assistant Examiner—Bret Hayes
(74) Attorney, Agent, or Firm—Carlson, Gaskey & Olds, PC

(57) ABSTRACT

A vehicle suspension is provided that includes a frame supporting a pair of laterally spaced apart suspension members pivotally supported on the frame and movable in a vertical direction. A pair of wheel ends is each supported respectively on one of the suspension members. A stabilizer bar is supported on the frame laterally between the suspension members. The stabilizer bar includes opposing ends each respectively proximate to one of the suspension members. A pair of resilient stabilizer bar links each respectively interconnect one of the ends and one of the suspension members and transmit torsional force to the stabilizer bar in response to movement of the suspension members in the vertical direction during roll conditions. The links have first and second deflection rates during the roll condition with the first rate being less than the second deflection rate. The links transition from the first deflection rate to the second deflection rate and from the second deflection rate to an effective zero deflection rate.

28 Claims, 3 Drawing Sheets

ROLL BUMPER STABILIZER BAR LINKS

BACKGROUND OF THE INVENTION

This invention relates to a stabilizer bar for a vehicle suspension system, and more particularly, the invention relates to stabilizer bar links used to attach the ends of the stabilizer bar to a vehicle suspension member.

Stabilizer bars are used in vehicle suspension systems to stabilize the vehicle laterally during vehicle turning and maneuvers in which the vehicle rolls side to side. In addition to stabilizing the vehicle, the stabilizer bar provides feedback to the vehicle operator regarding the stability of the vehicle during the turning maneuver. Providing a soft feel in which the vehicle rolls appreciatively during a turning maneuver, the driver is made aware of the vehicle's instability thereby encouraging the driver to operate the vehicle more conservatively to prevent loss of control of the vehicle during the turning maneuver. By way of contrast, a firm or hard vehicle provides the vehicle operator with feedback that the vehicle is stable by rolling very little during the turning maneuver. In this manner, the vehicle operator may drive more aggressively than desired causing the vehicle to suddenly lose traction and spin out of control.

The roll feel provided by the suspension assembly is determined by the stiffness of the suspension springs, the stiffness of the stabilizer bar itself, and the stiffness of the bushings used in the connections of the stabilizer bars and suspension members such as lower control arms. The roll stiffness is typically selected to provide either a soft feel or a firm or hard feel depending upon the particular vehicle application and expectation of the driver. It would be desirable to provide a variable roll stiffness and feedback to the driver during various roll conditions.

SUMMARY OF THE INVENTION AND ADVANTAGES

The present invention provides a vehicle suspension including a frame supporting a pair of laterally spaced apart suspension members pivotally supported on the frame and movable in a vertical direction. A pair of wheel ends is each supported respectively on one of the suspension members. A stabilizer bar is supported on the frame laterally between the suspension members. The stabilizer bar includes opposing ends each respectively proximate to one of the suspension members. A pair of resilient stabilizer bar links each respectively interconnect one of the ends and one of the suspension members and transmit torsional force to the stabilizer bar in response to movement of the suspension members in the vertical direction during roll conditions. The links have first and second deflection rates during the roll condition with the first rate being less than the second deflection rate. The links transition from the first deflection rate to the second deflection rate and from the second deflection rate to an effective zero deflection rate.

Accordingly, the above invention provides a variable roll stiffness and feedback to the driver during various roll conditions.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
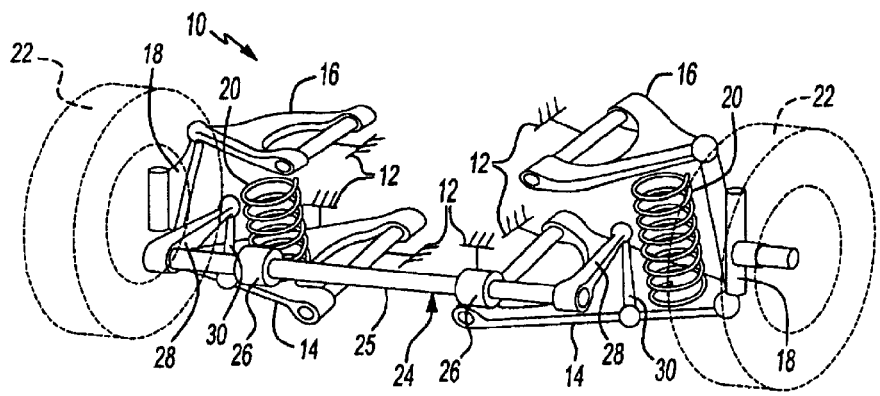
FIG. 1 is a perspective view of a vehicle suspension system.

A vehicle suspension system 10 is shown in FIG. 1. The system 10 includes a frame 12 that supports the suspension members including a tower control arm 14 and an upper control arm 16. A knuckle 18 is secured between the lower control arm 14 and upper 46 control arm 16. A spring 20 may be arranged between the tower control arm 14 and the frame 12. Wheel ends 22 are supported by the knuckles 18. Although a four-bar suspension arrangement is shown, it is to be understood that the present invention may be utilized with any suspension arrangement.

Figure 2:
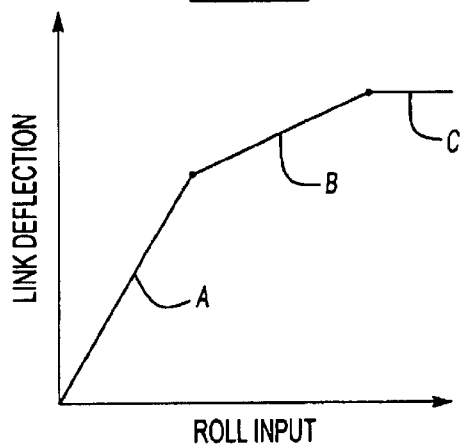
FIG. 2 is a chart depicting the link deflection versus roll input for the present invention stabilizer bar links.
Figure 3:
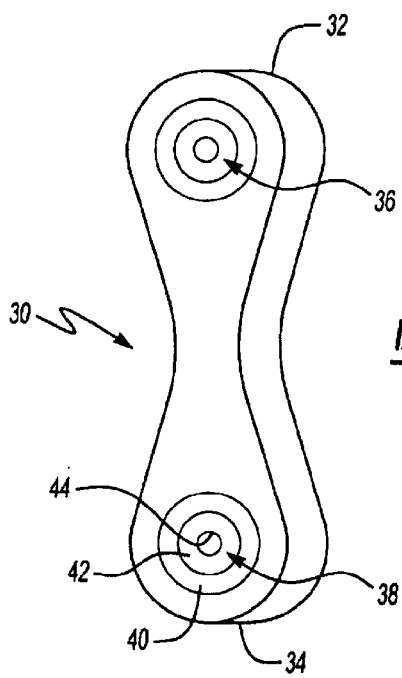
FIG. 3 is a stabilizer bar link having a bushing with a variable deflection rate.

A stabilizer bar 24 is arranged laterally between the lower control arms 14 on either side of the vehicle. The stabilizer bar 24 includes a lateral bar portion 25 supported on the frame 12 by brackets 26. The stabilizer bar 24 also includes arms 28 that are secured to the lower control arms 14 by stabilizer bar links 30. The stabilizer bar links 30 transmit the vertical inputs from the lower control arms 14 to the stabilizer bar 24 to realize stability to a vehicle during roll conditions and provide feedback to the vehicle operator indicative of the vehicle stability. The present invention provides a roll curve shown in FIG. 2 that provides at least a soft feel (shown by curve A), a him feel (shown by curve B), and a hard feel (shown by curve C).

The stabilizer bar link 30 includes first 32 and second 34 ends defining first 36 and second 38 connections. Each of the connections may include first 40 and second 42 resilient members that are coaxial with one another that define a bushing. The bushing includes a hole 44 for receiving a fastener that attaches the stabilizer bar link between the suspension member mid the stabilizer bar. The first 40 and second 42 resilient members may be made out of a rubber material. The first 40 resilient member may be softer than the second 42 resilient member such that the first 40 resilient member deflects greater than the second 42 resilient member In this manner, the first 40 resilient member will begin deflecting first and provide a soft feel. The second 42 resilient member will than begin to deflect after the first 40 resilient member has deflected and provide a firmer feel. Finally, the first 40 and second 42 resilient members will no longer deflect and provide an effectively zero deflection rate which provides a hard feel to the vehicle operator.

Figure 4:
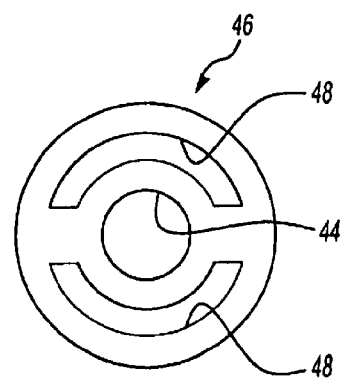
FIG. 4 is an alternative bushing.

The bushing 46 shown in FIG. 4 may also be used with the stabilizer bar link 30 to provide a variable deflection rate. For example, the bushing 46 includes arcuate apertures 48 arranged about the hole 44. The bushing 46 will deflect until the arcuate apertures 48 become closed and the inner portion of the hole 44 engages the outer portion of the bushing 46 to provide a firm feel. The bushing 46 will cease deflecting and provide a hard feel to the vehicle operator.

Figure 5:
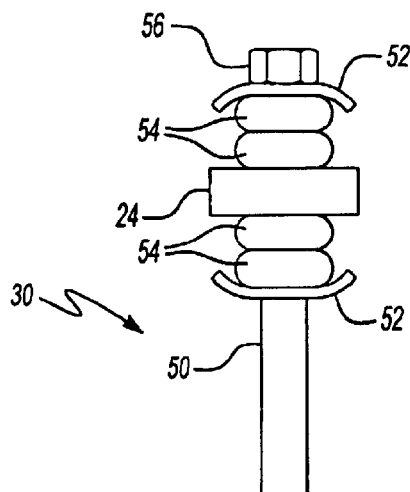
FIG. 5 is another stabilizer bar link of the present invention.

Another stabilizer bar link arrangement is shown in FIG. 5. The stabilizer bar link 30 includes a link 50 having flanges 52. Resilient member 54 are arranged about the lower control arm 14 and the stabilizer bar 24 to effectively sandwich the suspension member aid bar between the flanges 52. The fasteners 56 such as nuts are secured to the link 50 to connect the stabilizer bar 24 to the lower control arm 14. The resilient members 54 adjacent to the lower control arm 14 and stabilizer bar 24 may have a first deflection rate, and the resilient members 54 adjacent to the flanges 52 may have a second deflection rate different than the first deflection rate.

Figure 6:
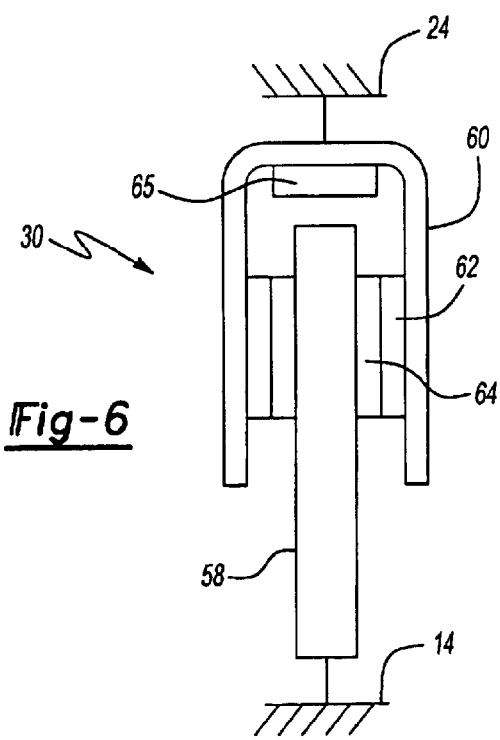
FIG. 6 is yet another stabilizer bar link of the present invention.

Another stabilizer bar link a arrangement is shown in FIG. 6. The link 30 may include a rigid member 58 telescopically received within a housing 60. The housing 60 may be secured to the stabilizer bar 24 and the rigid member 58 may be secured to the lower control arm 14. First 62 and second 64 resilient members may be coaxially arranged relative to one another. The first 62 and second 64 resilient members may be secured to one another and secured between the rigid member 58 and the housing 60. The first 62 resilient member has a first deflection rate, and the second 64 resilient member has a second deflection rate different than the first 62 resilient member. The housing 60 may include a stop 65 to limit the motion of the rigid member 58 to the housing 60.

Figure 7:
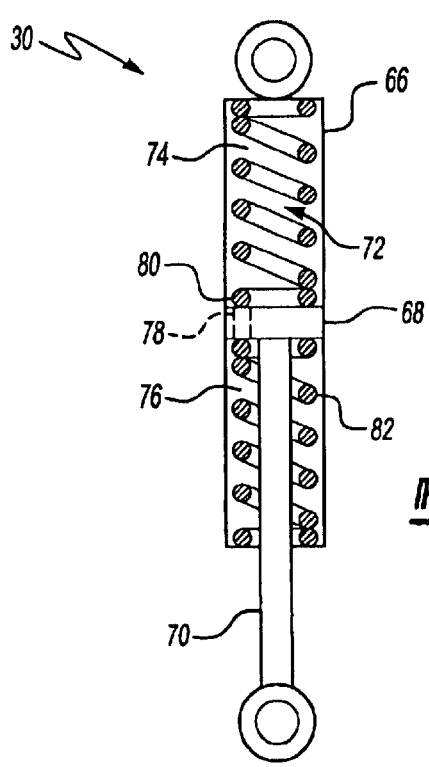
FIG. 7 is still another stabilizer bar link of the present invention.
Figure 8:
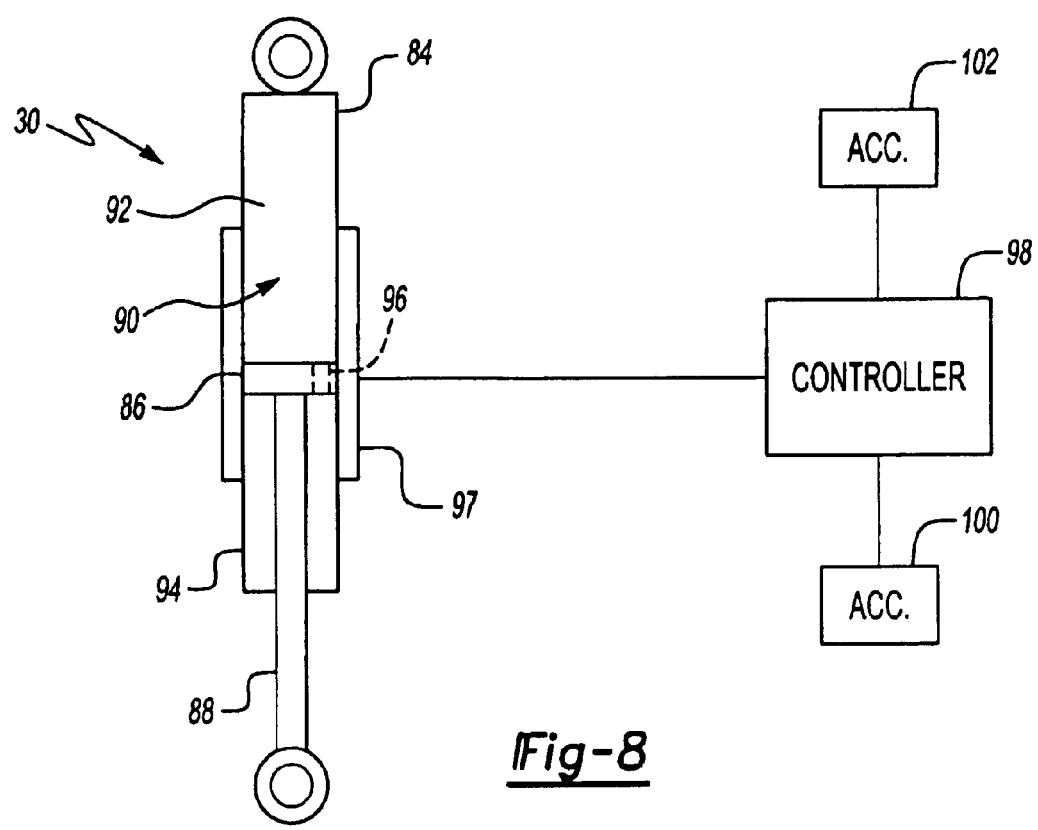
FIG. 8 is yet another stabilizer bar link of the present invention having active control.

The first stabilizer links are shown in FIG. 7 and 8. Referring to FIG. 7, the link 30 may include a housing 66 having a piston 68 disposed therein. A rod 70 is secured to the piston 68 and may be attached to die lower control arm 14. The housing 66 may be attached to the stabilizer bar 24. The housing 66 defines a fluid cavity 72 that is separated into first 74 and second 76 chambers by the piston 68. The housing 66 is filled with hydraulic fluid. An orifice 78 may be arranged in the piston 68 to define a damping rate that corresponds to a first deflection rate. First 80 and second 82 springs may be respectively arranged within the first 74 and second 76 chambers. The first 80 and second 82 springs define a second deflection rate.

Referring to FIG. 8, a magneto-rheological fluid stabilizer bar link 30 is shown. The magneto-rheological fluid stabilizer bar link 30 includes a housing 84 having a piston 86 disposed therein with a rod 88 connected to the piston 86. The housing 84 and rod 88 are connected between the lower control arm 14 and the stabilizer bar 24. The housing 84 defines a fluid cavity 90 separated into first 92 and second 94 chambers by the piston 86. The piston 86 may include an orifice 96 for providing damping. A coil 87 may be arranged about the housing 84 and is connected to a controller 98. The controller 98 energizes the coil 97 and creates a magnetic field about the housing 84 to change the viscosity of the magneto-rheological fluid thereby changing the fluid flow through the orifice 96. Accelerometers 100 and 102 are connected to the controller 98 and provide lateral and forward/rearward acceleration. The controller 98 is programmed to selectively control the magnetic field produced by the coil 97 in response to the accelerometers 100 and 102 to provide variable roll damping. In this manner an infinitely variable damping or deflection rate may be provided by the magneto-rheological fluid stabilizer bar link 30.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle suspension system comprising:
    a frame;
    a pair of laterally spaced apart suspension members pivotally supported on said frame and movable in a vertical direction;
    a pair of wheel ends with each wheel end supported on one of said suspension members;
    a stabilizer bar supported on said frame laterally between said suspension members, said stabilizer bar including opposing ends each respectively proximate to one of said suspension members; and
    a pair of resilient stabilizer bar links each respectively interconnecting one of said opposing stabilizer bar ends and one of said suspension members and transmitting a torsional force to said stabilizer bar in response to movement of said suspension members in said vertical direction during a roll condition, said pair of resilient stabilizer bar links having a first deflection rate and a second deflection rate during said roll condition with said first deflection rate being less than said second deflection rate, and said pair of resilient bar links transitioning from said first deflection rate to said second deflection rate and from said second deflection rate to an effective zero deflection rate.

2. The vehicle suspension system according to claim 1, wherein each of said pair of resilient stabilizer bar links includes opposing link ends with one of said opposing link ends secured to one of said opposing stabilizer bar end at a first connection and the other of said opposing link ends secured to one of said suspension members at a second connection.

3. The vehicle suspension system according to claim 2, wherein said pair of resilient stabilizer bar links include at least one elastomeric member providing both the first deflection rate and the second deflection rate.

4. The vehicle suspension system according to claim 2, wherein each of said pair of resilient stabilizer bar links includes a first resilient member and a second resilient member respectively providing said first deflection rate and said second deflection rate.

5. The vehicle suspension system according to claim 4, wherein said first connection and said second connection each include a bushing having a hole adapted to receive a connection member, said bushing defined by said first resilient member and said second resilient member being arranged coaxial with one another about said hole.

6. The vehicle suspension system according to claim 4, wherein said first resilient member and said second resilient member are arranged adjacent to one another.

7. The vehicle suspension system according to claim 4, wherein one of said first connection and said second connection is provided by a rigid member telescopically received in a housing and movable axially relative thereto with said first resilient member arranged about said rigid member and said second resilient member arranged about said first resilient member, said first resilient member and said second resilient member interconnecting said rigid member to said housing.

8. The vehicle suspension system according to claim 4, wherein said first resilient member and said second resilient member are arranged about one another.

9. The vehicle suspension system according to claim 2, wherein said first connection and said second connection each include a bushing having a hole adapted to receive a connection member, said bushing having at least one aperture arranged about said hole.

10. The vehicle suspension system according to claim 9, wherein said bushing includes spaced apart arcuate apertures about said hole.

11. The vehicle suspension system according to claim 1, wherein each of said pair of resilient stabilizer bar links includes opposing link ends, with one of said opposing link ends secured to one of said opposing stabilizer bar ends and the other of said opposing link ends secured to one of said suspension members, each of said pair of resilient stabilizer bar links including a housing connected to one of said opposing link ends and defining a fluid cavity with a piston disposed in said fluid cavity and said piston connected to the other of said opposing link ends, said piston separating said fluid cavity into first and second chambers with said piston including an orifice fluidly connecting said first and second chambers.

12. The vehicle suspension system according to claim 11, wherein first and second springs are respectively disposed within said first and second chambers and cooperating with said piston.

13. The vehicle suspension system according to claim 12, wherein said fluid cavity is filled with hydraulic fluid.

14. The vehicle suspension system according to claim 11, wherein said fluid cavity is filled with magneto-rheological fluid.

15. The vehicle suspension system according to claim 14, wherein a controller is connected to a magnetic source cooperating with said magneto-rheological fluid, said controller commanding said magnetic source to generate a change in viscosity of said magneto-rheological fluid to provide said first deflection rate and said second deflection rate.

16. The vehicle suspension system according to claim 15, wherein an accelerometer is connected to said controller providing a vehicle rate of roll signal to said controller.

17. The method according to claim 1, wherein said transitioning from said first deflection rate to said second deflection rate and from said second deflection rate to an effective zero deflection rate occurs during said roll condition.

18. A method of providing driver feedback during a vehicle roll maneuver comprising the steps of:
  a) providing a stabilizer bar attached to suspension members by stabilizer bar links;
  b) rolling the vehicle at a first stabilizer bar link deflection rate providing a soft feel to the driver during a vehicle roll;
  c) rolling the vehicle at a second stabilizer bar link deflection rate providing a firm feel to the driver during a vehicle roll; and
  d) rolling the vehicle at an effective zero deflection rate providing a hard feel to the driver during the vehicle roll.

19. The method according to claim 18, wherein the first stabilizer bar link deflection rate, second stabilizer bar link deflection rate, and zero deflection rate of said steps b)–d) are provided a single stabilizer bar link at each of opposing ends of the stabilizer bar.

20. The method according to claim 19, wherein each of the single stabilizer bar links includes at least one elastomeric member providing the deflection rates.

21. The method according to claim 19, wherein each of the single stabilizer bar links includes a piston and cylinder arrangement.

22. The method according to claim 18, wherein the first stabilizer bar link deflection rate and the second stabilizer bar link deflection rate are respectively provided by a first resilient member and a second resilient member.

23. A stabilizer bar link assembly comprising:
  a link having a first flange coaxially opposing a second flange;
  a suspension component attachment area on said link between said first flange and said second flange;
  a first set of resilient members arranged between said suspension component attachment area and said first flange, said first set of resilient members having a first deflection rate and a second deflection rate with said first deflection rate being less than said second deflection rate; and
  a second set of resilient members arranged between said suspension component and said second flange, said second set of resilient members generally equivalent to said first set of resilient members.

24. The stabilizer bar link assembly according to claim 23 further including a fastener attachable to said link to secure said suspension component, said first set of resilient members, and said second set of resilient members between said first flange and said second flange.

25. The stabilizer bar link assembly according to claim 23 further including said suspension component mounted to said suspension component attachment area, wherein said suspension component is a suspension member.

26. The vehicle suspension stabilizer bar link according to claim 23 further including said suspension component mounted to said suspension component attachment area, wherein said suspension component is a stabilizer bar.

27. The vehicle suspension stabilizer bar link according to claim 23 wherein said second set of resilient members has a third deflection rate generally equivalent to said first deflection rate of said first set of resilient members, said second set of resilient members has a fourth deflection rate generally equivalent to said second deflection rate of said first set of resilient members.

28. The vehicle suspension stabilizer bar link according to claim 23 wherein said first set of resilient members transitions from said first deflection rate to said second deflection rate and from said second deflection rate to an effective zero deflection rate during a roll condition.

* * * * *

UNITED STATES PATENT AND TRADEMARK OFFICE
CERTIFICATE OF CORRECTION

PATENT NO. : 6,866,276 B2
DATED : March 15, 2005
INVENTOR(S) : Carlstedt, Robert P. et al.

It is certified that error appears in the above-identified patent and that said Letters Patent is hereby corrected as shown below:

Column 4,
Line 11, please add -- stabilizer bar -- after "opposing".
Line 22, please add -- stabilizer -- after "resilient".
Line 29, please replace "end" with -- ends --.

Column 6,
Line 2, please add -- by -- after "provided".

Signed and Sealed this

Sixteenth Day of August, 2005

JON W. DUDAS
*Director of the United States Patent and Trademark Office*